C. H. NOELL.
TAMPER OR MARKER FOR PLANTERS.
APPLICATION FILED NOV. 5, 1910.
993,271.
Patented May 23, 1911.
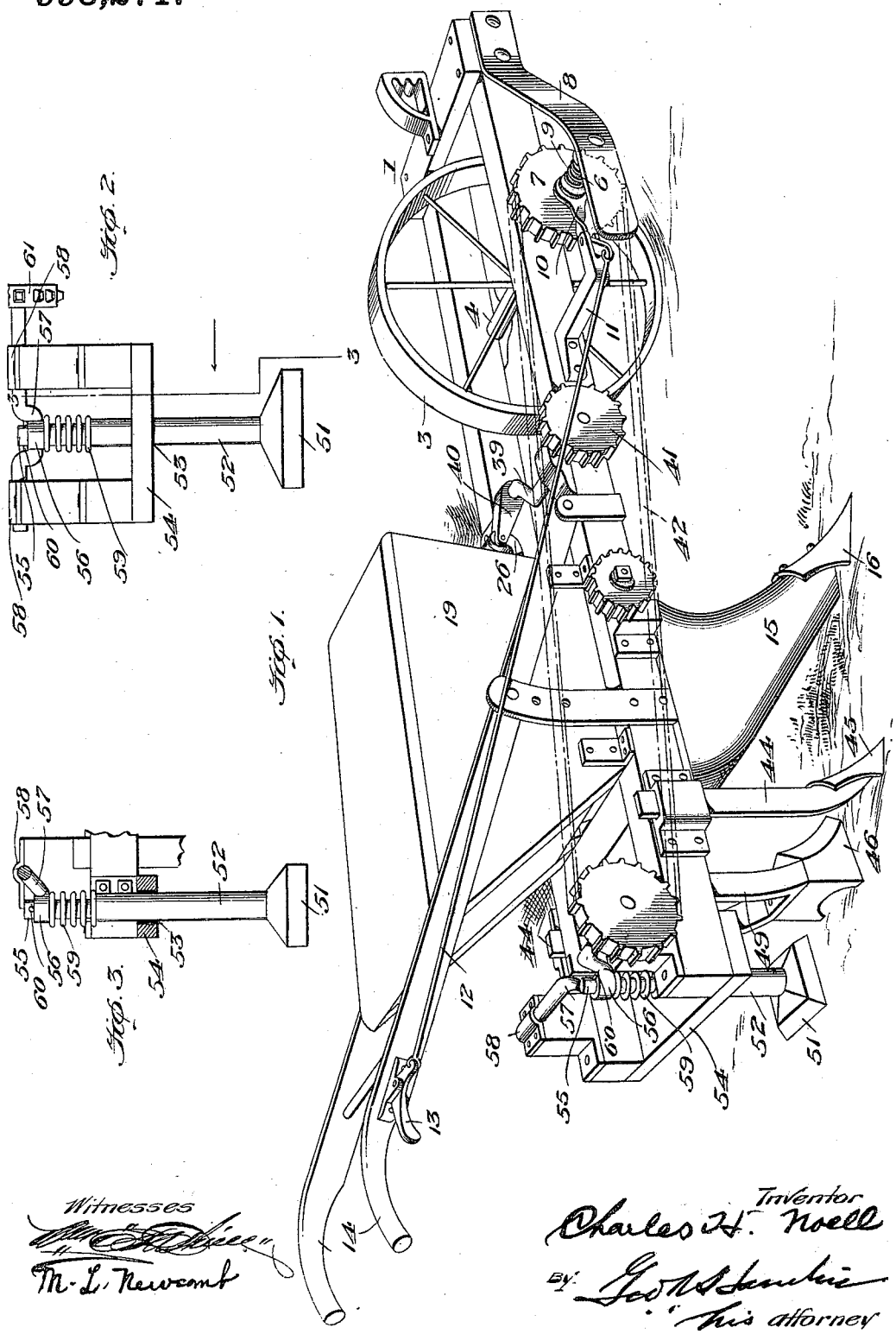

UNITED STATES PATENT OFFICE.

CHARLES H. NOELL, OF MONTVALE, VIRGINIA, ASSIGNOR OF ONE-HALF TO G. M. ARRINGTON, OF MONTVALE, VIRGINIA.

TAMPER OR MARKER FOR PLANTERS.

993,271. Specification of Letters Patent. Patented May 23, 1911.

Original application filed July 30, 1910, Serial No. 574,716. Divided and this application filed November 5, 1910. Serial No. 590,930.

*To all whom it may concern:*

Be it known that I, CHARLES H. NOELL, a citizen of the United States, residing at Montvale, (R. F. D.,) county of Bedford, and State of Virginia, have invented certain new and useful Improvements in Tampers or Markers for Planters, of which the following is a specification.

This invention relates to tampers or markers for planters.

The present application is a division of my copending application Serial No. 574,716, filed July 30, 1910, and patented Dec. 6, 1910, No. 977,535 for corn planters and hillers, and has for its object the provision of a tamper or padder of novel construction and operation which, while adapted for use in connection with the corn planter and hiller set forth in my aforesaid patent, will be adapted for utilization on other agricultural machines where it is desired to periodically tamp or pad the ground to properly compact the earth about seed or fertilizer which has been dropped.

The invention contemplates, further, novel means for operating or throwing out of operation at will the padder or tamper, especially when it is used in connection with the machine set forth in my aforesaid patent, or, any machine where it is advantageous to throw the padder or hiller into or out of operation at will.

The padder or tamper of the present invention embodies a foot having a stem slidable freely through a guide and provided with an improved spring cushion connection with certain operating means which is in turn, operatively connected to the traction wheel of the machine and designed to be thrown into or out of operation at will.

The invention is shown in the accompanying drawings in connection with the machine of my patent aforesaid.

In said drawing—Figure 1 is a perspective view, dotted lines representing the sprocket chain for operating the padder and the other parts of the machine; Fig. 2, a detail rear elevation of the padder or tamper; and Fig. 3, a section on line 3—3 of Fig. 2.

The frame 1 has a traction wheel 3, whose shaft 4 is journaled in suitable bearings thereon. Slidable on said shaft is a sprocket wheel 7, which has a sleeve 6 adapted to be made to engage a clutch (not shown) on shaft 4 by a coil-spring 9 which surrounds the shaft and is located between it and the guard or fender 8 in which the end of the shaft is journaled. The sleeve 6 is provided with an annular groove receiving the fork of a bell-rank lever 10 pivoted to a bracket 11 on frame 1 and controlled by a rod 12 and a handle 13, the latter being carried by the handles 14 of the machine in convenient position to be readily grasped by the person using the machine. The mechanism described controls the operation of the padder or tamper and of other parts of the machine.

Mounted on frame 1 is a hopper 19 provided with suitable fertilizer and seed compartments (not shown) and from which there extends downwardly a shoe or conducting tube 15 having a point or shovel 16. The feed slide 26 for the fertilizer and seed is operated by a pitman 40 and a crank shaft 39 carrying a sprocket wheel 41 which is adapted to engage and be operated by a chain 42, shown by dotted lines, which runs around the sprocket wheel 7.

Rearwardly of the conducting shoe or tube 15 are standards 44 of hillers 45 and immediately in the rear of the hillers is the combined coverer and fender 46 which has a two-armed standard or hanger 49 secured to the frame 1. The standards 44 and 49 are adjustable vertically on the frame 1 and are adapted to be secured at different heights.

The padder or tamper which constitutes the present invention is disposed rearwardly of the coverer 46 and in line therewith, being composed of a foot 51, a stem 52, slidable loosely through an aperture 53 in a cross-piece 54 on frame 1, and provided at its upper end with a reduced part 55 which passes loosely through a loop 56 on a crank 57 which has its end parts journaled in bearings 58 on frame 1. A coil-spring 59 surrounds the reduced part 55 between the crank and the shoulder on stem 52, and a pin or the like 60 limits the loose motion of the padder or tamper. The shaft of the crank has a sprocket wheel 61 around which passes the sprocket chain 42.

In the machine of my patent with which the present invention is particularly adapted for use, the sprocket wheel 61 is of such size that the tamper or padder is periodically brought down upon the hill at the point where the corn and fertilizer have been deposited so as to suitably compact the hill at those points, and the spring 59 causes this action to be made an elastic as well as a yielding one, thus compacting the soil in the best manner possible and also permitting the padder or tamper to yield if it strikes a stone or other hard substance.

The clutch mechanism controlling the locking of the sprocket wheel 7 and the shaft 4, being controlled by the handle 13, enables the operator to throw the tamper (as well as the other mechanisms) out of operation whenever it is desired to do so and, aside from the particular devices shown in my aforesaid patent, the present invention may be used in other connections, but controlled in the same fashion as herein set forth.

Having thus described my invention, what I claim as new and desire to secure by Letters Patent, is:—

In a planter and hiller, a tamper comprising the combination with the operating shaft having a crank provided with a loop or sleeve, of a guide, a tamper both slidable through and rockable in said guide and having a part passing loosely through the loop or sleeve aforesaid, a coil spring surrounding the tamper and engaged therewith and with the loop or sleeve, and means on the tamper for engaging the other side of said loop or sleeve, whereby the operative connection between the tamper and the crank is cushioned.

In testimony whereof, I hereunto affix my signature in presence of two witnesses.

CHARLES H. NOELL.

Witnesses:
S. S. LAMBETH, Jr.,
R. L. ELLIOTT.

---

Copies of this patent may be obtained for five cents each, by addressing the "Commissioner of Patents, Washington, D. C."